United States Patent
Lee et al.

(10) Patent No.: US 11,171,354 B2
(45) Date of Patent: Nov. 9, 2021

(54) ELECTRODE ASSEMBLY AND METHOD FOR MANUFACTURING THE SAME

(71) Applicant: LG CHEM, LTD., Seoul (KR)

(72) Inventors: Sang Kyun Lee, Daejeon (KR); Jung Kwan Pyo, Daejeon (KR); Cha Hun Ku, Daejeon (KR)

(73) Assignee: LG CHEM, LTD., Seoul (KR)

( * ) Notice: Subject to any disclaimer, the term of this patent is extended or adjusted under 35 U.S.C. 154(b) by 272 days.

(21) Appl. No.: 15/759,618

(22) PCT Filed: Jul. 7, 2017

(86) PCT No.: PCT/KR2017/007330
§ 371 (c)(1),
(2) Date: Mar. 13, 2018

(87) PCT Pub. No.: WO2018/009042
PCT Pub. Date: Jan. 11, 2018

(65) Prior Publication Data
US 2019/0044177 A1    Feb. 7, 2019

(30) Foreign Application Priority Data

Jul. 8, 2016 (KR) .................. 10-2016-0086662
Jul. 6, 2017 (KR) .................. 10-2017-0086059

(51) Int. Cl.
*H01M 10/04* (2006.01)
*H01M 50/46* (2021.01)
(Continued)

(52) U.S. Cl.
CPC ..... *H01M 10/0459* (2013.01); *H01M 50/403* (2021.01); *H01M 50/46* (2021.01); *H01M 50/463* (2021.01)

(58) Field of Classification Search
CPC ............. H01M 10/0459; H01M 2/145; H01M 2/1673; H01M 2/18
See application file for complete search history.

(56) References Cited

U.S. PATENT DOCUMENTS

| 6,726,733 B2 | 4/2004 | Lee et al. |
| 9,692,082 B2 | 6/2017 | Jung et al. |

(Continued)

FOREIGN PATENT DOCUMENTS

| CN | 1212687 C | 7/2005 |
| CN | 104584307 A | 4/2015 |

(Continued)

OTHER PUBLICATIONS

International Search Report for PCT/KR2017/007330 dated Sep. 29, 2017.

(Continued)

*Primary Examiner* — Jimmy Vo
(74) *Attorney, Agent, or Firm* — Birch, Stewart, Kolasch & Birch, LLP (57) ABSTRACT

The present invention relates to an electrode assembly and a method for manufacturing the same, and more particularly, to an electrode assembly in which a degree of alignment of cells is improved and a method for manufacturing the same. An electrode assembly according to the present invention comprises a separator sheet folded in a zigzag shape and a unit cell having a structure in which an electrode and a separator are alternately stacked, wherein the unit cell is repeatedly disposed between the separator sheet that is folded in a zigzag shape, and at least a portion of the unit cell and at least a portion of the separator sheet are bonded to each other.

13 Claims, 8 Drawing Sheets

(51) Int. Cl.
*H01M 50/403* (2021.01)
*H01M 50/463* (2021.01)

(56) References Cited

U.S. PATENT DOCUMENTS

| | | |
|---|---|---|
| 2002/0160258 A1 | 10/2002 | Lee et al. |
| 2011/0244304 A1* | 10/2011 | Shinyashiki ............ H01M 2/16 429/139 |
| 2015/0180082 A1 | 6/2015 | Jung et al. |
| 2016/0028064 A1 | 1/2016 | Choi et al. |

FOREIGN PATENT DOCUMENTS

| | | |
|---|---|---|
| EP | 1201005 B1 | 5/2002 |
| JP | 2003-523061 A | 7/2003 |
| KR | 10-2012-0111078 A | 10/2012 |
| KR | 10-2012-0117306 A | 10/2012 |
| KR | 10-1361675 B1 | 2/2014 |
| KR | 10-1567674 B1 | 11/2015 |
| KR | 10-2015-0134660 A | 12/2015 |
| KR | 10-1618317 B1 | 5/2016 |
| WO | 2014042424 A1 | 3/2014 |

OTHER PUBLICATIONS

Supplementary European Search Report dated Feb. 14, 2019 in corresponding European Application No. 17824597.

\* cited by examiner

ELECTRODE ASSEMBLY AND METHOD FOR MANUFACTURING THE SAME

CROSS-REFERENCE TO RELATED APPLICATION

The present application claims the benefit of the priority of Korean Patent Application Nos. 10-2016-0086662, filed on Jul. 8, 2016, and 10-2017-0086059, filed on Jul. 6, 2017, which are hereby incorporated by reference in their entirety.

TECHNICAL FIELD

The present invention relates to an electrode assembly and a method for manufacturing the same, and more particularly, to an electrode assembly in which a degree of alignment of cells is improved and a method for manufacturing the same.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Such a secondary battery may be configured so that an electrode assembly is built in a battery case. The electrode assembly mounted in the battery case is a chargeable/dischargeable power generating device having a structure in which a positive electrode/a separator/a negative electrode are stacked.

Figure 1:
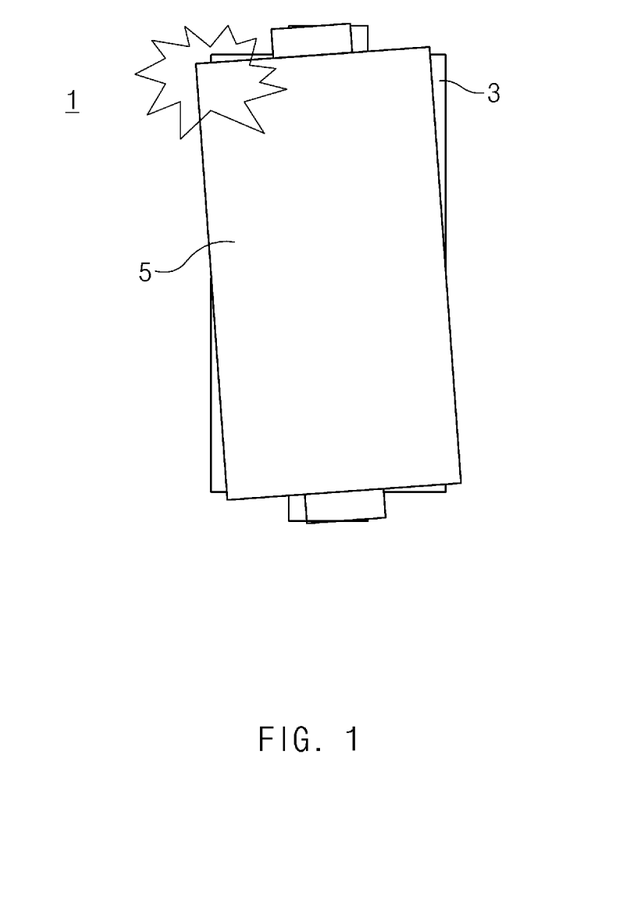
FIG. 1 is a plan view illustrating a stacked type electrode assembly of electrode assemblies according to a related art.
Figure 2:
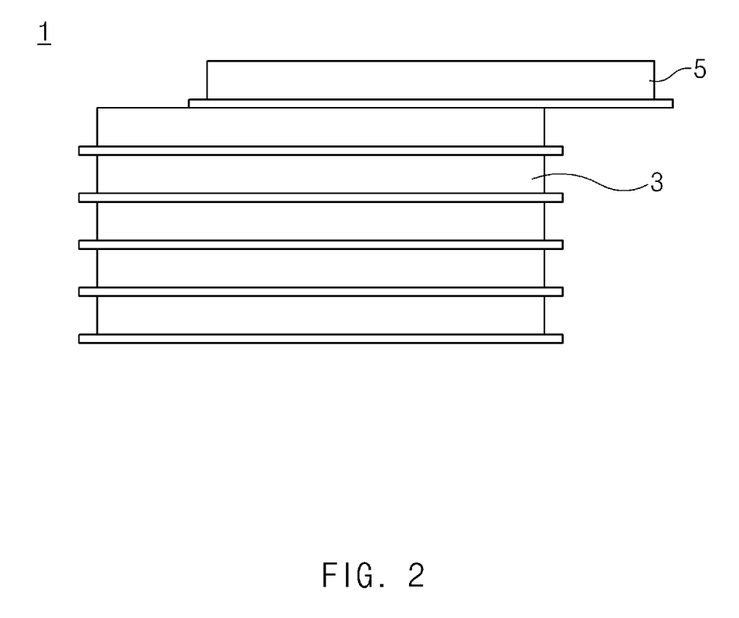
FIG. 2 is a cross-sectional view illustrating the stacked type electrode assembly of the electrode assemblies according to the related art.

FIG. 1 is a plan view illustrating a stacked type electrode assembly of electrode assemblies according to the related art. FIG. 2 is a cross-sectional view illustrating the stacked type electrode assembly of the electrode assemblies according to the related art.

Referring to FIGS. 1 and 2, a plurality of unit cells 3 are stacked to constitute an electrode assembly 1. However, when a large number of unit cells 3 are stacked, a degree of alignment of the electrode assembly 1 may be deteriorated. This is done because, when a large amount of unit cells 3 are stacked, a unit cell 1 which is not kept in place, but is separated from the stacked unit cells 3 easily occurs.

As described above, when the plurality of unit cells are stacked to manufacture the electrode assembly, a degree of alignment of the electrode assembly may be easily deteriorated.

DISCLOSURE OF THE INVENTION

Technical Problem

The present invention has been made to solve the above problems, and an object of the present invention is to provide an electrode assembly having an improved degree of alignment in a stacked type electrode assembly and a method for manufacturing the same. Particularly, an object of the present invention is to provide an electrode assembly having a structure that is capable of being improved in productivity, in which a degree of alignment of the electrode assembly is capable of being improved through a low-cost and high-efficiency method, and a method for manufacturing the same. Also, an object of the present invention is to provide an electrode assembly that is capable of being improved in degree of alignment of the electrode assembly while preventing wetting from being deteriorated and a method for manufacturing the same.

Technical Solution

An electrode assembly according to present invention comprises a separator sheet folded in a zigzag shape and a unit cell having a structure in which an electrode and a separator are alternately stacked, wherein the unit cell is repeatedly disposed between the separator sheet that is folded in a zigzag shape, and at least a portion of the unit cell and at least a portion of the separator sheet are bonded to each other.

A method for manufacturing an electrode assembly according to the present invention comprises a preparation step of preparing a unit cell having a structure, in which an electrode and a separator are alternately stacked, and a separator sheet, a unit cell arrangement step of repeatedly arranging the unit cell between the separator sheet that is folded in a zigzag shape, and a bond step of bonding at least a portion of the unit cell to at least a portion of the separator sheet.

Advantageous Effects

According to the electrode assembly and the method for manufacturing the same according to the present invention, in the stacked type electrode assembly, the degree of alignment of the electrode assembly may be improved, and particularly, in the electrode assembly having the structure that is capable of being improved in productivity, the degree of alignment of the electrode assembly may be improved through the high efficiency method. In addition, the degree of alignment of the electrode assembly may be improved while preventing the wetting from being deteriorated.

MODE FOR CARRYING OUT THE INVENTION

Preferred embodiments of the present invention will be described below in more detail with reference to the accompanying drawings. However, the present invention is not limited to the embodiments below.

Embodiment 1

Figure 3:
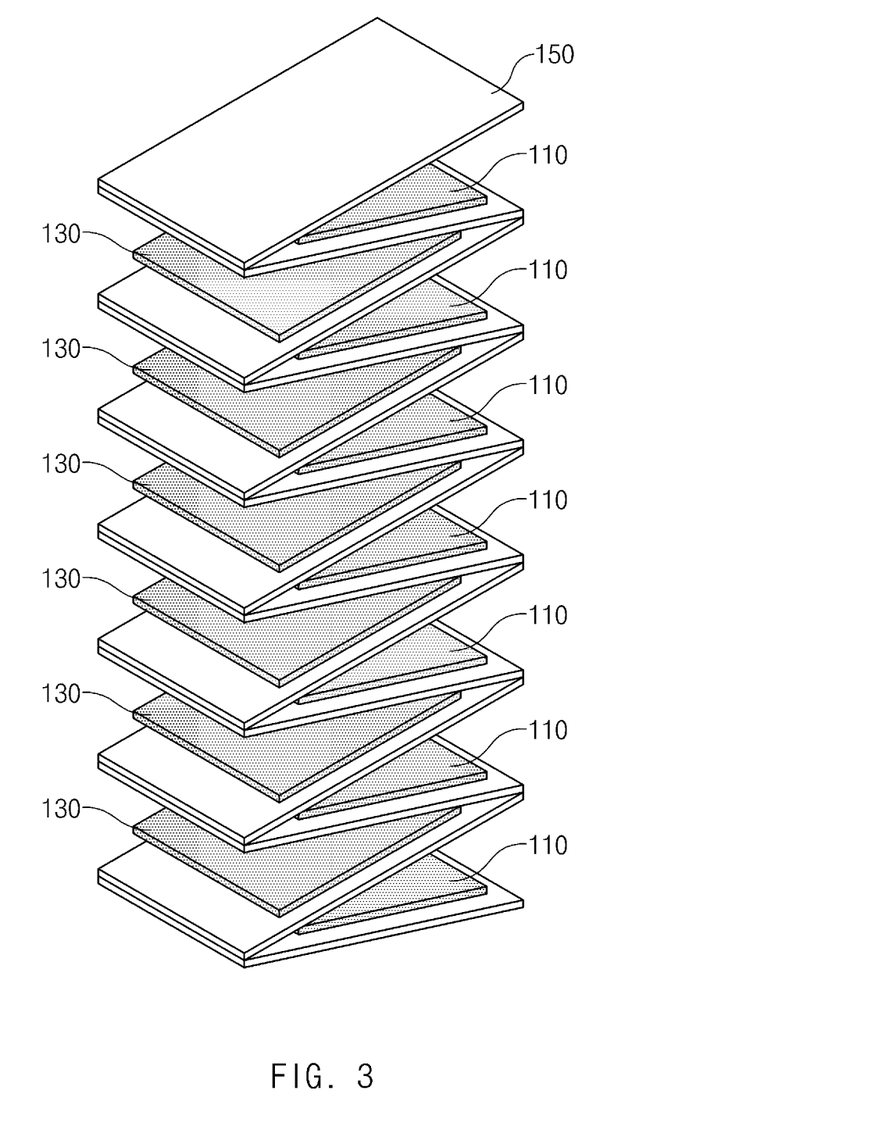
FIG. 3 is a conceptual view illustrating a zigzag-stacked structure in an electrode assembly according to Embodiment 1 of the present invention.
Figure 4:
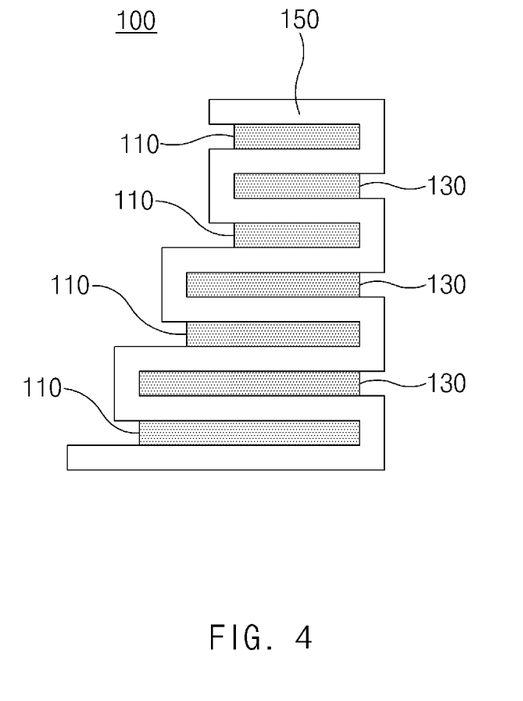
FIG. 4 is a conceptual view illustrating another shape of the zigzag-stacked structure in the electrode assembly according to Embodiment 1 of the present invention.
Figure 5:
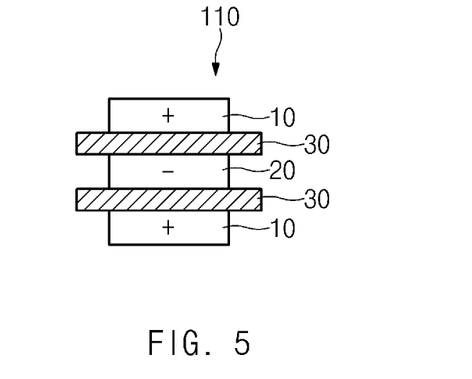
FIG. 5 is a cross-sectional view of a first unit cell in the electrode assembly according to Embodiment 1 of the present invention.
Figure 6:
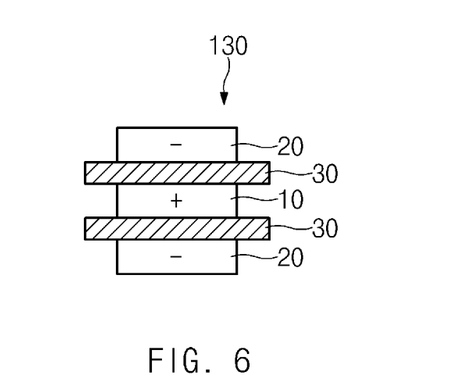
FIG. 6 is a cross-sectional view of a second unit cell in the electrode assembly according to Embodiment 1 of the present invention.
Figure 7:
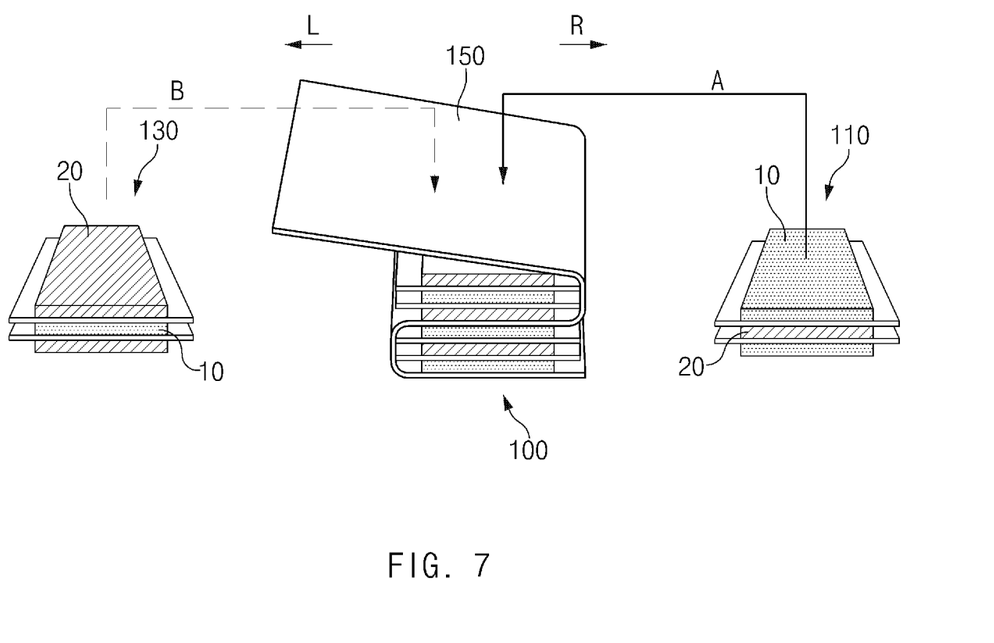
FIG. 7 is a perspective view illustrating a method for manufacturing the electrode assembly according to Embodiment 1 of the present invention.
Figure 8:
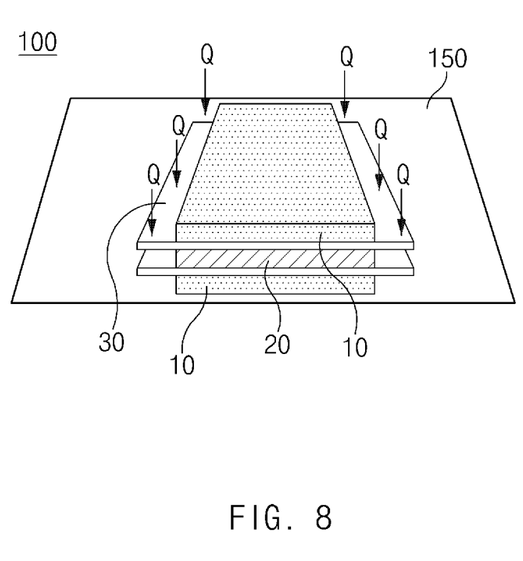
FIG. 8 is a perspective view illustrating the electrode assembly according to Embodiment 1 of the present invention.

FIG. 3 is a conceptual view illustrating a zigzag-stacked structure in an electrode assembly according to Embodiment 1 of the present invention. FIG. 4 is a conceptual view illustrating another shape of the zigzag-stacked structure in the electrode assembly according to Embodiment 1 of the present invention. FIG. 5 is a cross-sectional view of a first unit cell in the electrode assembly according to Embodiment 1 of the present invention. FIG. 6 is a cross-sectional view of a second unit cell in the electrode assembly according to Embodiment 1 of the present invention. FIG. 7 is a perspective view illustrating a method for manufacturing the electrode assembly according to Embodiment 1 of the present invention. FIG. 8 is a perspective view illustrating the electrode assembly according to Embodiment 1 of the present invention.

Hereinafter, an electrode assembly according to Embodiment 1 of the present invention will be described with reference to FIGS. 3 to 8.

Referring to FIGS. 3 to 6, the electrode assembly according to Embodiment 1 of the present invention comprises a separator sheet 150 and unit cells 110 and 130. The separator sheet 150 is folded in a zigzag shape, and the unit cells 110 and 130 may be repeatedly disposed between the separator sheet 150 that is folded in the zigzag shape (see FIG. 3). Here, the unit cells 110 and 130 may have a structure in which electrodes 10 and 20 and a separator 30 are alternately stacked. Also, each of the unit cells 110 and 130 may be provided as one unit because the electrodes 10 and 20 and the separator 30 provided in the unit cells 110 and 130 are bonded to each other through lamination.

Particularly, the unit cells 110 and 130 may comprise a first unit cell 110 and a second unit cell 130. FIG. 5 illustrates the first unit cell 110, and FIG. 6 illustrates the second unit cell 130. Referring to FIGS. 5 and 6, the first unit cell 110 comprises a first electrode 10, a separator 30, a second electrode 20, a separator 30, and a first electrode 10, which are sequentially stacked. Here, the first electrode 10 may be a positive electrode.

The second unit cell 130 comprises a second electrode 20, a separator 30, a first electrode 10, a separator 30, and a second electrode 20, which are sequentially stacked. Here, the second electrode 20 may be a negative electrode.

Referring to FIG. 3, the electrode assembly according to Embodiment 1 of the present invention may have a structure in which the first unit cell 110 and the second unit cell 130 are repeatedly disposed and alternately stacked between the separator sheet 150 that is folded in the zigzag shape.

Although the unit cells may have the same size as illustrated in FIG. 3, the present invention is not limited thereto. For example, the unit cells may have sizes different from each other. FIG. 4 illustrates a shape in which the unit cells 110 and 130 have sizes that decrease upward in phases.

When the unit cells decrease in size in phases, as illustrated in FIG. 4, the electrode assembly 100 may have a stepped shape as a whole. When the electrode assembly 100 has the stepped shape, the electrode assembly 100 having various shapes may be realized. Furthermore, in this case, the secondary battery may be maximized in space utilization.

Referring to FIG. 7, a method for manufacturing the electrode assembly 100 while stacking the separator sheet 150 in the zigzag shape may be performed as follows. The separator sheet 150 may be folded in a left direction L with respect to the drawing, and then, the first unit cell 110 may be stacked on the separator sheet 150 (A). Thereafter, the separator sheet 150 may be folded in a right direction R, and then, the second unit cell 130 may be stacked on the separator sheet 150 (B).

When the above-described processes in which the first unit cell 110 and the second unit cell 130 are disposed between the separator sheet 150 while folding the separator sheet 150 in the zigzag shape is repeatedly performed in the above-described manner, the stacked type electrode assembly 100 may be manufactured. The electrode assembly 100 having the zigzag shape or the method for manufacturing the electrode assembly 100 having the zigzag shape may be the electrode assembly 100 or the method for manufacturing the electrode 100, in which productivity is capable of being significantly improved.

In the electrode assembly 100 according to Embodiment 1 of the present invention, as described above, the separator sheet 150 may be folded in the zigzag shape, and the unit cells 110 and 130 are disposed between the folded separator sheets 150. Here, at least a portion of the unit cells 110 and 130 and at least a portion of the separator sheet 150 may be bonded to each other.

When the unit cells 110 and 130 and the separator sheet 150 are bonded to each other, a degree of alignment of the electrode assembly 100 may be improved in the stacked type electrode assembly 100. That is, as illustrated in FIGS. 1 and 2, the unit cells may be prevented from being separated in place, and thus, the degree of alignment of the electrode assembly 100 may be significantly improved. Although an external impact or movement occurs, the alignment of the electrode assembly 100 may not be disturbed.

Referring to FIG. 8, in the bonding of the unit cells 110 and 130 and the separator sheet 150, particularly, in the electrode assembly 100 according to Embodiment 1 of the present invention, the separator 30 and the separator sheet 150, which are provided in each of the unit cells 110 and 130, may be bonded to each other. The bonding of the separator 30 and the separator sheet 150 may be thermal bonding through heating Q.

Here, the thermal bonding through the heating Q may be thermal bonding through heating performed in a temperature range of 50° C. to 120° C. If the temperature is less than 50° C., bonding strength may not be sufficiently manifested. If the temperature is greater than 120° C., the separator may be deformed.

When the thermal bonding is performed, the separator sheet 150 and the separator 30, which is provided in the unit cell, may be bonded to each other along a side surface of each of the electrodes 10 and 20 provided in the unit cells 110 and 130. Also, the separator sheet 150 and the separator 30, which is provided in the unit cell, may be bonded to each other along a circumference of each of the electrodes provided in the unit cells 110 and 130.

As described above, since the separator 30 and the separator sheet 150, which are provided in each of the unit cells 110 and 130, are bonded to each other, the electrodes 10 and 20 provided in the unit cells may be sealed from the outside. This means that the electrode is isolated from the outside, or that the electrode is sealed from the outside.

At least one of the separator sheet 150 and the separator 30 provided in each of the unit cells 110 and 130 may be surface-treated through plasma discharge or corona discharge.

When a surface of a polymer material such as the separator or the separator sheet is treated by using plasmas or corona, the bonding strength may be improved. As a result, while the separator 30 and the separator sheet 150 are bonded to each other or sealed, a temperature for the bonding or the sealing may be reduced. According to the above-described method, the electrode assembly 100 may be improved in degree of alignment with low-cost and high-efficiency.

The electrode assembly 100 according to Embodiment 1 of the present invention has been described above. Hereinafter, a method for manufacturing the electrode assembly 100 will be described.

The method for manufacturing the electrode assembly 100 according to Embodiment 1 of the present invention comprises a preparation step, a unit cell arrangement step, and a bonding step.

Here, the preparation step may be a step of preparing unit cells 110 and 130 having a structure, in which the electrodes 10 and 20 and the separator 30 are alternately stacked, and the separator sheet 150. In the preparation step, a process of bonding the electrodes 10 and 20 and the separator 30, which are provided in each of the unit cells 110 and 130, to each other may be performed. Thus, each of the unit cells may be formed as one unit.

In he preparation step, the unit cells 110 and 130 comprising a first unit cell 110, in which a first electrode 10, a separator 30, a second electrode 20, a separator 30, and a first electrode 10 are sequentially stacked, and a second unit cell 130, in which a second electrode 20, a separator 30, a first electrode 10, a separator 30, and a second electrode 20 are sequentially stacked, are prepared.

In the unit cell arrangement step may be a step of repeatedly arranging the unit cells 110 and 130 between the separator sheet 150 that is folded in the zigzag shape. In the unit cell arrangement step, the first unit cell 110 and the second unit cell 130 are repeatedly disposed and alternately stacked between the separator sheet 150 that is folded in the zigzag shape.

The bonding step may be a step of bonding at least a portion of the unit cells 110 and 130 to at least a portion of the separator sheet 150. Particularly, the bonding step may be a step of bonding the separator 30 and the separator sheet 150, which are provided in each of the unit cells 110 and 130, to each other.

The bonding may be performed by heating the separator 30 and the separator sheet 150, which are provided in each of the unit cells 110 and 130. When the bonding is performed, the separator sheet 150 and the separator 30 which is provided in the unit cell, may be bonded to each other along a side surface of each of the electrodes 10 and 20 provided in the unit cells 110 and 130. Alternatively, the separator sheet 150 and the separator 30 which is provided in the unit cell, may be bonded to each other along a circumference of each of the electrodes provided in the unit cells.

Here, the bonding through heating may be performed at a temperature range of 50° C. to 120° C. If the temperature is less than 50° C., bonding strength may not be sufficiently manifested. If the temperature is greater than 120° C., the separator may be deformed.

As described above, when the separator 30 and the separator sheet 150, which are provided in each of the unit cells 110 and 130, are bonded to each other, the electrodes provided in the unit cells may be sealed from the outside.

The method for manufacturing the electrode assembly 100 according to Embodiment 1 of the present invention may further comprise a surface treating step of performing surface treatment on at least one of the separator 30 and the separator sheet 150, which are provided in each of the unit cells 110 and 130, through plasma discharge or corona discharge before the bonding step.

When the plasma treating or corona treating is performed, a surface of a polymer material such as the separator 30 or the separator sheet 150 may be improved in bonding strength. Thus, the process of manufacturing the electrode assembly 100 may be more efficiently and effectively performed.

Embodiment 2

Figure 9:
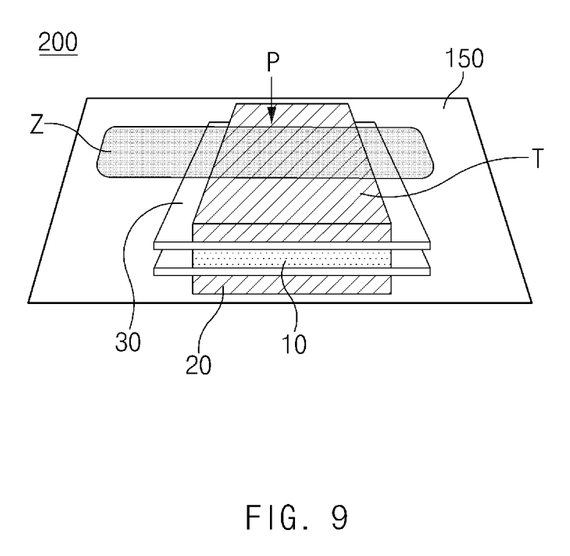
FIG. 9 is a perspective view illustrating an electrode assembly according to Embodiment 2 of the present invention.

FIG. 9 is a perspective view illustrating an electrode assembly according to Embodiment 2 of the present invention.

An electrode assembly according to Embodiment 2 may be similar to that according to Embodiment 1. However, Embodiment 2 is different from Embodiment 1 in structure and manner in which the unit cell and the separator sheet are bonded to each other.

For reference, the same (equivalent) component as that according to the foregoing embodiment is given by the same (equivalent) reference number, and thus, their detailed description will be omitted.

Hereinafter, the electrode assembly according to Embodiment 2 of the present invention will be described with reference to FIG. 9.

The electrode assembly 200 according to Embodiment 2 of the present invention may comprise a separator sheet 150 and unit cells 110 and 130. The separator sheet 150 may be folded in a zigzag shape, and the unit cells may be repeatedly disposed between the separator sheet 150 that is folded in the zigzag.

Here, at least a portion of the unit cells 110 and 130 and at least a portion of the separator sheet 150 may be bonded to each other.

Particularly, in the electrode assembly 200 according to Embodiment 2 of the present invention, the separator sheet 150 and the electrodes 10 and 20 which are provided in the unit cell, may be bonded to each other. The bonding may be performed though heating and pressing P. The heating and pressing P may be performed on the separator sheet 150 covering the electrodes 10 and 20 of the unit cell by using a heat press. As a result, at least a portion of the unit cells 10 and 20 and at least a portion of the separator sheet 150 may be bonded to each other.

Here, the bonding through heating may be performed at a temperature range of 50° C. to 120° C. If the temperature is less than 50° C., bonding strength may not be sufficiently manifested. If the temperature is greater than 120° C., the separator may be deformed.

Also, the bonding through the pressing P may be performed at a pressure range of 100 kgf/cm$^2$ to 400 kgf/cm$^2$. When the pressure is greater than 100 kgf/cm$^2$, a portion of the electrode may be efficiently performed. Also, when the pressure is greater than 400 kgf/cm$_2$, the electrode or the separator may be damaged or deformed.

In the electrode assembly 200 according to Embodiment of the present invention, a portion of the outermost electrode T of the electrodes which are provided in the unit cell and a portion of the separator sheet 150, may be bonded to each other. FIG. 9 illustrates a state in which the heating and the pressing P are performed on a portion Z of an area of the electrode.

When a portion of the electrode which are provided in the unit cell and a portion of the separator sheet 150, are bonded to each other, bonding strength on an interface between the electrode and the separator sheet may have a value ranging from 20 gf/20 mm to 30 gf/20 mm with respect to the negative electrode/the separator. When the bonding strength is less than 20 gf/20 mm, there is a possibility of occurrence of an alignment problem on the battery manufacturing process (various battery manufacturing steps). When the bonding strength is greater than 30 gf/20 mm, it is difficult to wet an electrolyte into the cell.

When the electrode and the separator sheet 150 are bonded to each other on the portion Z of the area, the wetting of the electrode assembly 200 may be prevented from being deteriorated. When the electrode is bonded to the entire surface of the separator sheet 150, the wetting of the electrode assembly 200 may be significantly deteriorated.

Thus, in the electrode assembly 200 according to Embodiment 2 of the present invention, the degree of alignment of the electrode assembly 200 may be significantly improved while preventing the wetting of the electrode assembly 200 from being deteriorated.

The method for manufacturing the electrode assembly 200 according to Embodiment 2 of the present invention is similar to that for manufacturing the electrode assembly 100 according to Embodiment 1 of the present invention. However, there is a difference in the bonding step.

Particularly, according to the method for manufacturing the electrode assembly 200 according to Embodiment 2 of the present invention, the bonding step is performed in a manner in which the electrodes 10 and 20 and the separator sheet 150, which are provided in each of the unit cells 110 and 130, are bonded to each other. The bonding may be performed by heating and pressing P the electrode and the separator sheet 150, which are provided in the unit cell. Also, in this process, only a portion of the outermost electrode T and only a portion of the separator sheet 150 may be bonded to each other.

While the embodiments of the present invention have been described with reference to the specific embodiments, it will be apparent to those skilled in the art that various changes and modifications may be made without departing from the spirit and scope of the invention as defined in the following claims.

DESCRIPTION OF SYMBOLS

1: Electrode assembly
3: Unit cell
5: Separated unit cell
10: First electrode
20: Second electrode
30: Separator
100, 200: Electrode assembly
110: First unit cell
130: Second unit cell
150: Separator sheet
L: Left direction
R: Right direction
Z: Portion of area
T: Outermost electrode

The invention claimed is:

1. An electrode assembly comprising:
a separator sheet folded in a zigzag shape; and
a unit cell having a structure in which an electrode and a separator are alternately stacked, the unit cell having a pair of side edges and a pair of end edges extending between the pair of side edges,
wherein the unit cell is repeatedly disposed between the separator sheet that is folded in a zigzag shape,
wherein the separator sheet and only a portion of the electrode assembly are bonded to each other, and
wherein the portion extends between the pair of side edges and is spaced from the pair of end edges.

2. The electrode assembly of claim 1, wherein the bonding is performed through heating and pressing.

3. The electrode assembly of claim 1, wherein a portion of the outermost electrode of the electrode assembly and a portion of the separator sheet, are bonded to each other.

4. A method for manufacturing an electrode assembly, the method comprising:
a preparation step of preparing a unit cell having a structure, in which an electrode and a separator are alternately stacked, and a separator sheet, the unit cell having a pair of side edges and a pair of end edges extending between the pair of side edges;
a unit cell arrangement step of repeatedly arranging the unit cell between the separator sheet that is folded in a zigzag shape; and
a bond step of bonding only a portion of the unit cell to the separator sheet,
wherein the portion extends between the pair of side edges and is spaced from the pair of end edges.

5. The method of claim 4, wherein, in the preparation step, the electrode and the separator, which are provided in the unit cell, are bonded to each other through lamination.

6. The method of claim 4, wherein, in the preparation step, the unit cell comprises: a first unit cell in which a first electrode, a separator, a second electrode, a separator, and a first electrode are sequentially stacked; and a second unit cell in which a second electrode, a separator, a first electrode, a separator, and a second electrode are sequentially stacked, and
in the unit cell arrangement step, the first unit cell and the second unit cell are repeatedly disposed and alternately stacked between the separator sheet that is folded in the zigzag shape.

7. The method of claim 4, wherein, in the bonding step, the separator sheet and the separator which is provided in the unit cell, are bonded to each other.

8. The method of claim 7, wherein the bonding is performed by heating the separator sheet and the separator which is provided in the unit cell.

9. The method of claim 7, wherein the separator sheet and the separator which is provided in the unit cell, are bonded to each other along a side surface of an electrode provided in the unit cell.

10. The method of claim 7, wherein the separator sheet and the separator which is provided in the unit cell, are bonded to each other along a circumference of an electrode of the unit cell.

11. The method of claim 4, wherein, in the bonding step, the separator sheet and the electrode which is provided in the unit cell, are bonded to each other.

12. The method of claim 11, wherein the bonding is performed by heating and pressing the separator sheet and the electrode which is provided in the unit cell.

13. The method of claim 11, wherein a portion of the outermost electrode of the electrodes which are provided in the unit cell and a portion of the separator sheet, are bonded to each other.

* * * * *